United States Patent
Alvarez et al.

(10) Patent No.: US 8,306,118 B1
(45) Date of Patent: Nov. 6, 2012

(54) HIGH QUALITY LOW BITRATE VIDEO CODING BY ENABLING AND DISABLING A NON-RESIDUAL MODE

(75) Inventors: José R. Alvarez, Sunnyvale, CA (US); Jiangtao Wen, La Jolla, CA (US)

(73) Assignee: Maxim Integrated, Inc., San Jose, CA (US)

( * ) Notice: Subject to any disclaimer, the term of this patent is extended or adjusted under 35 U.S.C. 154(b) by 1660 days.

(21) Appl. No.: 11/365,195

(22) Filed: Mar. 1, 2006

(51) Int. Cl.
*H04N 7/12* (2006.01)
(52) U.S. Cl. ......... 375/240.15; 375/240.01; 375/240.02; 375/240.12; 375/240.16; 375/240.22
(58) Field of Classification Search ................. 375/240, 375/240.01, 240.03, 240.15, 240.16, 240.13, 375/240.02, 240.12, 240.22
See application file for complete search history.

(56) References Cited

U.S. PATENT DOCUMENTS

| | | | |
|---|---|---|---|
| 7,502,544 B2* | 3/2009 | Takemoto | 386/343 |
| 7,656,949 B1* | 2/2010 | Zhang et al. | 375/240.02 |
| 8,045,618 B2* | 10/2011 | Cote et al. | 375/240.16 |
| 8,155,189 B2* | 4/2012 | Yan | 375/240.13 |
| 2004/0111526 A1* | 6/2004 | Baldwin et al. | 709/231 |
| 2005/0031036 A1* | 2/2005 | Bjontegaard | 375/240.13 |
| 2006/0008004 A1* | 1/2006 | Karube et al. | 375/240.16 |
| 2006/0193385 A1* | 8/2006 | Yin et al. | 375/240.12 |
| 2006/0245502 A1* | 11/2006 | Cheng et al. | 375/240.24 |
| 2007/0086523 A1* | 4/2007 | Yan | 375/240.13 |
| 2008/0063075 A1* | 3/2008 | Kondo et al. | 375/240.16 |
| 2009/0129474 A1* | 5/2009 | Pandit et al. | 375/240.16 |
| 2009/0185627 A1* | 7/2009 | Park et al. | 375/240.26 |
| 2009/0225829 A2* | 9/2009 | Kwon et al. | 375/240.03 |
| 2009/0262835 A1* | 10/2009 | Srinivasan et al. | 375/240.16 |
| 2010/0002945 A1* | 1/2010 | Sugimoto et al. | 382/238 |

* cited by examiner

*Primary Examiner* — Hirdepal Singh
(74) *Attorney, Agent, or Firm* — North Weber & Baugh LLP

(57) ABSTRACT

A method for encoding video, comprising the steps of (A) encoding a number of macroblocks of a video signal with a non-residual mode disabled, (B) checking each of the macroblocks for a null information pattern, and (C) re-encoding each of the macroblocks having the null information pattern with the non-residual mode enabled.

17 Claims, 3 Drawing Sheets

150

152

ENCODE A NUMBER OF MACROBLOCKS OF A VIDEO SIGNAL WITH A NON-RESIDUAL MODE DISABLED

154

CHECK EACH MACROBLOCK FOR A NULL INFORMATION PATTERN

156

RE-ENCODE EACH MACROBLOCK HAVING A NULL INFORMATION PATTERN WITH THE NON-RESIDUAL MODE ENABLED

HIGH QUALITY LOW BITRATE VIDEO CODING BY ENABLING AND DISABLING A NON-RESIDUAL MODE

FIELD OF THE INVENTION

The present invention relates to video processing generally and, more particularly, to a method and/or architecture for implementing high quality low bitrate video coding by enabling and disabling a non-residual mode.

BACKGROUND OF THE INVENTION

Conventional video compression standards use the PSKIP mode (or the DIRECT mode) as a tool to achieve high compression efficiency. With the PSKIP mode, a macroblock is coded by motion compensation using the default predicted motion vector based on the motion vector of surrounding macroblocks, with no transform coefficient for compensating for the prediction error. Therefore, only a flag signaling the usage of the PSKIP mode for the macroblock needs be sent, which often achieves high coding efficiency.

However, as a result of the compactness of the coded representation of the macroblock, and a combination of a default (usually sub-optimal motion vector and the lack of correction of the prediction error with residual information) the distortion between the coded macroblock and original macroblock is usually high. Furthermore, when macroblocks coded with the PSKIP mode are used as references for subsequently coded macroblocks, large compression distortion is possible by PSKIP compression being propagated, resulting in low visual quality over an extended period of time. Compensating for the low visual quality can be implemented, but at the expense of more bits spent in the processing of subsequent macroblocks. This problem is extremely severe when the bitrate is low, as relatively more PSKIP modes will be used to achieve the low target bitrate.

Recent video coding standards, such as H.264 and associated implementations, make use of rate distortion based mode decision to search for optimized rate distortion trade off among possible encoding choices such as PSKIP. However, such techniques are incapable of correctly comparing PSKIP mode and other encoding modes. This is because the virtually zero coding rate of the PSKIP mode makes a "fair" definition of the rate-distortion cost extremely difficult, as traditional distortion+lambda*rate based cost. While useful for comparing the encoding tradeoff for other encoding modes, such a definition is reduced to distortion only for the PSKIP mode. The impact of the quantization parameter used for other encoding modes of the same macroblock, as a function of lambda, can not be sufficiently taken into account for the calculation due to the zero-rate.

Another possible image quality improvement could prohibit the use of PSKIP mode altogether. However, such an implementation is also sub-optimal. For low complexity content encoded at low bit rates, many macroblocks will justifiably be encoded with the default predicted motion vector and no residual information. For these macroblocks, if the PSKIP mode is prohibited, a coded representation of the same reconstructed macroblock will entail coding of a NULL Information Pattern. In H.264, each of such a pattern of NULL information uses 5 bits per macroblock, corresponding to a 200 Kbps overhead for D1 (720×480) resolution coded at 30 frames a second (assuming all MBs in a frame were coded with the NULL representation instead of the much more efficient PSKIP mode), or a 20% overhead at 1 Mbps.

It would be desirable to implement non-residual mode coding of video to take advantage of the efficiency of the non-residual mode while using the non-residual mode only for macroblocks where the non-residual mode is needed and justified.

SUMMARY OF THE INVENTION

The present invention concerns a method for encoding video, comprising the steps of (A) encoding a number of macroblocks of a video signal with a non-residual mode disabled, (B) checking each of the macroblocks for a null information pattern, and (C) re-encoding each of the macroblocks having the null information pattern with the non-residual mode enabled.

The objects, features and advantages of the present invention include providing a method and/or apparatus for video encoding that may implement a high quality low bitrate video bitstream that may (i) enable and disable a non-residual mode and/or (ii) limit propagation of distortions caused by the non-residual mode.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be used to manipulate a non-residual mode to improve the bit-rate and/or quality of a video encoder. The present invention may be particularly useful for generating a high quality video bitstream while maintaining a low bit rate. A non-residual mode is a general term used herein to describe a PSKIP mode, a DIRECT mode, or any other similar mode that does not need previous macroblocks to be re-encoded. The non-residual mode may also describe a mode that does not need future (or subsequent) macroblocks to be re-encoded. In general, a PSKIP mode avoids encoding a particular macroblock, by calling for a second presentation of the previous macroblock. A DIRECT mode may be used to synthesize motion vectors from the surrounding blocks. In either the PSKIP mode or DIRECT mode, no information is used from previously presented macroblocks.

Figure 1:
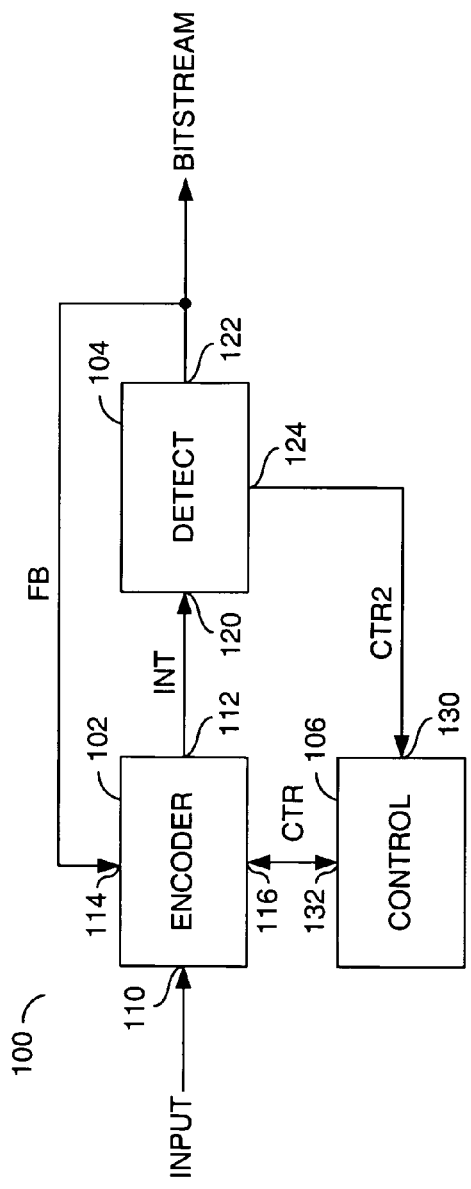
FIG. 1 is a block diagram of a video system implementing the present invention.

Referring to FIG. 1, a block diagram of a video system 100 is shown in accordance with a preferred embodiment of the present invention. The video system 100 generally comprises a block (or circuit) 102, a block (or circuit) 104, and a block (or circuit) 106. The circuit 102 may be implemented as an encoding circuit. The circuit 104 may be implemented as a detect circuit. The circuit 106 may be implemented as a control circuit.

The circuit 102 may have an input 110 that may receive a video input signal (e.g., INPUT). The circuit 102 may also have an output 112 that may present a signal (e.g., INT), an input 114 that may receive a signal (e.g., FB), and an input/output 116 that may present and/or receive a signal (e.g., CTR) from the control circuit 106. The circuit 104 may have an input 120 that may receive the signal INT, an output 122 that may present a signal (e.g., BITSTREAM), and an output 134 that may present a signal (e.g., CTR2). The control circuit 106 may have an input 130 that may receive the control signal CTR2 and an input/output 132 that may present and/or receive the control signal CTR. The signal CTR and the signal CTR2 may be implemented as control signals. The signal CTR2 may contain information relating to whether a non-residual mode has been detected. The signal CTR may be used to initiate a second encoding, by encoding the signal FB. The signal FB may be a feedback of the signal BITSTREAM that may be used to provide a second version of encoding (to be discussed in more detail in connection with FIGS. 3 and 4).

Figure 2:
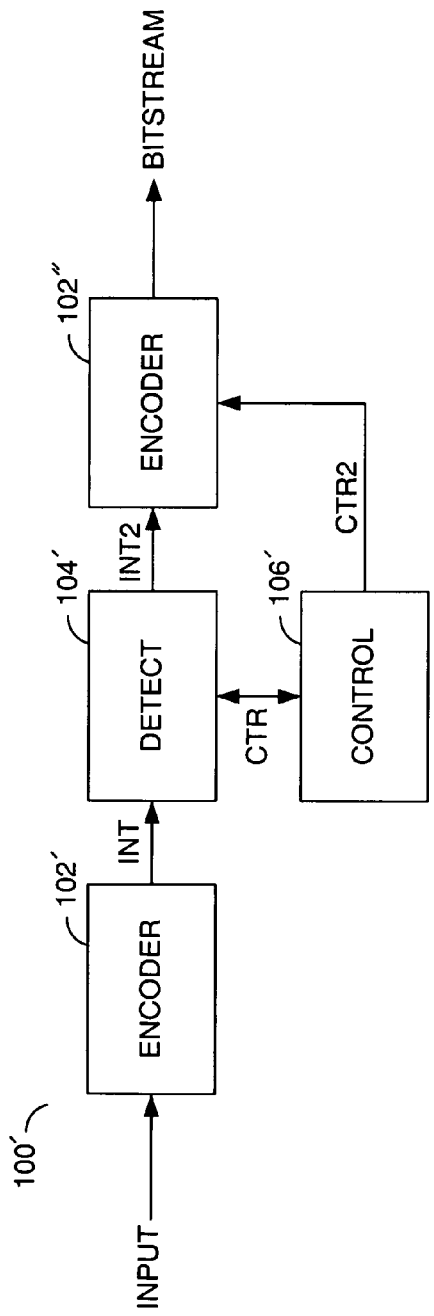
FIG. 2 is a block diagram of an alternate embodiment of the present invention.

Referring to FIG. 2, a block diagram of a video system 100' is shown illustrating an alternate embodiment of the present invention. The encoder 102', the detect circuit 104' and the control circuit 106' may be implemented similarly to the encoder 102, the detect circuit 104 and the control circuit 106 of FIG. 1. However, a second encoder 102" may be used to provide the second encoding (or re-encoding) of the signal BITSTREAM (or the signal FB). While the system 100 shows a single encoder 102, the system 100' shows the encoder 102' implemented separately from the encoder 102". By implementing a separate encoder 102' from the encoder 102", the system 100' may be implemented to operate in a more flexible environment. For example, the encoder 102', the detect circuit 104' and the control circuit 106' may be implemented on a first integrated circuit, while the encoder 102" may be implemented on a second integrated circuit. Alternately, the encoder 102' may be implemented on a first integrated circuit, while the encoder 102", the detect circuit 104' and the control circuit 106' may be implemented on a second integrated circuit. By dividing the encoder 102' and the encoder 102" onto separate integrated circuits, use of integrated circuits provided by separate manufacturers may be implemented. For example, the signal INT or the signal INT2 may be available as outputs from a first device (or integrated circuit). The signal may be used and modified by the present invention to provide a second level of encoding, without redesigning the original integrated circuit design. This may be particularly useful when a redesign is not practical.

Figure 3:
FIG. 3 is a flow diagram of the present invention.
Figure 3:
Figure 3:

Referring to FIG. 3, a method 150 is shown implementing an example of the present invention. The method 150 generally comprises a state (or step) 152, a state (or step) 154, a state (or step) 156 and a state (or step) 158. The state 152 may encode a number of macroblocks of a video signal with a non-residual mode disabled. The state 152 may encode the macroblocks using a rate distortion optimized motion estimation and/or quantization. The state 154 may check each of the macroblocks for a null information pattern. A null information pattern may comprise a quantized macroblock having all zero DCT coefficients and/or zero motion vector difference information. The state 156 may re-encode each of the macroblocks having the null information pattern with the non-residual mode enabled. In one example, the step (A) may receive a previously encoded bitstream comprising a number of macroblocks. The method 150 illustrates an example of the operation of the control block 108. The steps 152-156 are generally implemented in the control block 108. In one example, the steps 152-156 may be implemented using software. In another example, the steps 152-156 may be implemented using discrete and/or programmable logic gates.

Figure 4:
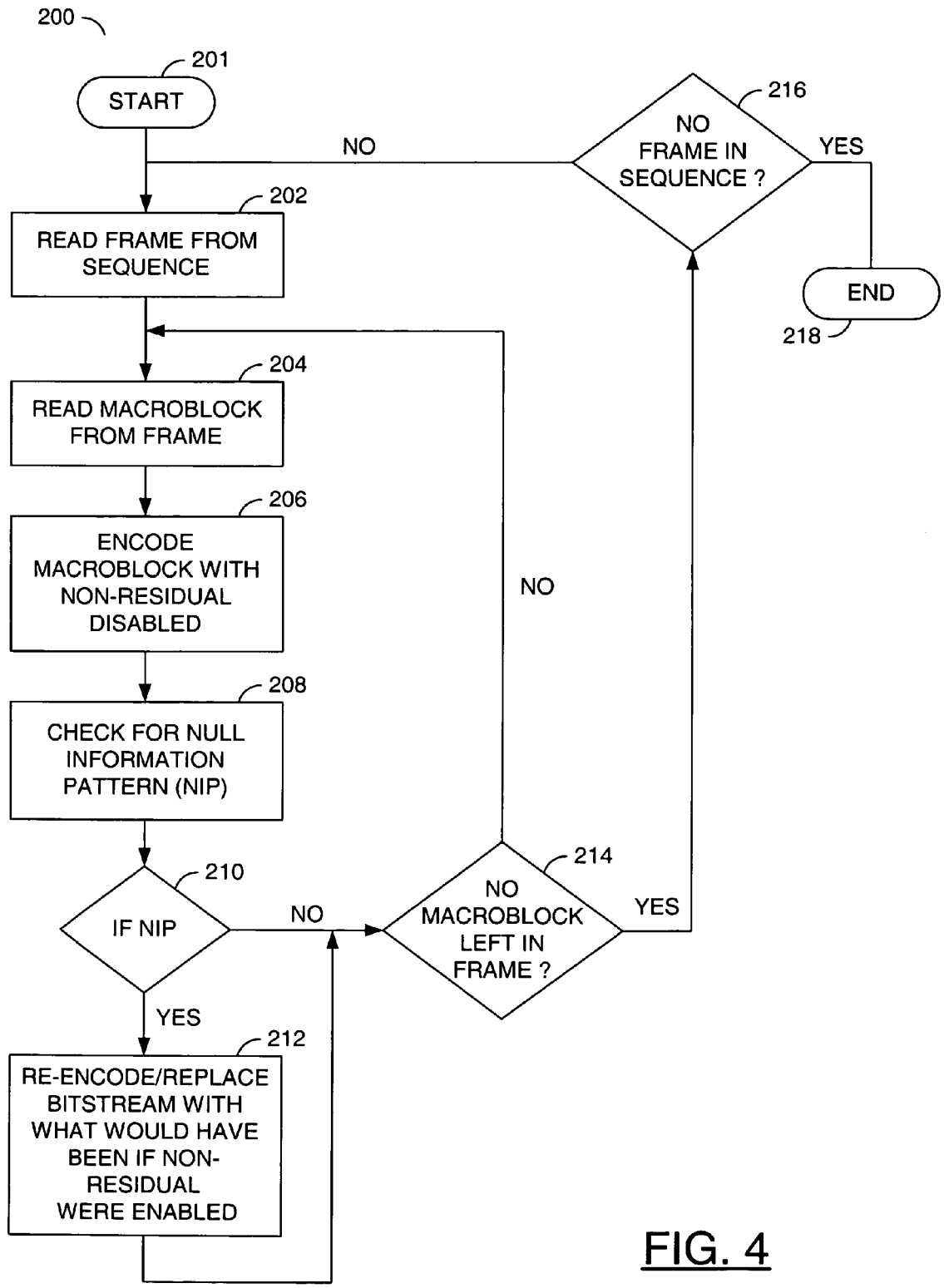
FIG. 4 is a more detailed flow diagram of the present invention.

Referring to FIG. 4, a more detailed diagram of a method 200 is shown. The method 200 generally comprises a state 201, a state 202, a state 204, a state 206, a state 208, a decision state 210, a state 212, a decision state 214, a decision state 216, and a state 218. The state 201 may be a start state. The state 202 may read a frame from the sequence (e.g., the signal INPUT). The state 204 may read a particular selected macroblock from the frame. The state 206 may encode the selected macroblock with the non-residual modes disabled. The state 208 may check for a null information pattern (NIP). The decision state 210 determines an action based on the presence of a null information pattern. If a null information pattern is present, the method 200 moves to the state 212. The state 212 re-encodes and/or replaces a portion of the bitstream with a frame that would have been present if the non-residual mode was enabled. Next, the method 200 moves to the state 214. The state 214 determines whether additional macroblocks are left in the frame. If no macroblocks are left in the frame, the method 200 moves to the state 216. If macroblocks are left in the frame, the method 200 moves back to the state 204. Next, the state 216 determines if another frame is in the sequence. If so, the method 200 moves to the state 202. If not, the method 200 ends at the state 218.

For a selected macroblock in the signal INPUT, the encoder 102 disables non-residual mode. The encoder 102 then encodes by performing rate distortion optimized motion estimation and quantization for each non-residual encoding mode. The rate distortion optimal encoding mode and the associated coded representation for the selected macroblock are selected by comparing the rate distortion cost of the optimal coded representation of the macroblock for each encoding mode. The encoding steps implemented are similar to rate distortion optimized encoding with the non-residual mode disabled.

Next, the encoder 102 examines the optimal coded representation of the selected macroblock. If the optimal coded representation is the same as that of the Null Information Pattern representation of the non-residual mode, then the non-residual mode is signaled. Otherwise, the coded representation is written to the signal BITSTREAM. The signal BITSTREAM may be stored in an output buffer (not shown).

The selection of the optimal coded representation in may also consider a number of different quantization parameter (QP) choices to optimize the use of the non-residual modes. For a given target quantization parameter, examine the nearest higher and lower QP values to determine if the selection of a given macroblock qualifies for PSKIP (or other non-residual mode). If the current MB has not produced a NIP but either higher or lower QP have generated NIPs, then the current MB should be skipped. If there is a discrepancy between the current QP results and that of its neighbors, the choice of PSKIP is not justified.

The present invention may be used to selectively enable and disable a non-residual mode (such as a PSKIP or DIRECT mode) to provide a high quality coded bitstream while maintaining a low bit rate. The present invention may analyze null information patterns in particular macroblocks to determine if the null information patterns are propagating an excessive amount of rate distortion. After detecting such an excessive rate distortion, particular macroblocks may be re-encoded without using the PSKIP or DIRECT modes. The re-encoded macroblock may be used to stop the propagation of distortion in subsequently encoded macroblocks. After re-encoding the particular selected macroblocks, the PSKIP or DIRECT modes may be re-enabled for subsequent encoding.

While the invention has been particularly shown and described with reference to the preferred embodiments thereof, it will be understood by those skilled in the art that various changes in form and details may be made without departing from the spirit and scope of the invention.

What is claimed is:

1. A method for encoding video, comprising the steps of:
   (A) encoding a number of macroblocks of a video signal with a non-residual mode disabled;
   (B) checking each of said macroblocks for a null information pattern;
   (C) transmitting a subset of macroblocks in said macroblocks with said non-residual mode enabled, the subset of macroblocks having said null information pattern; and
   wherein said non-residual mode is selected from a group consisting of a PSKIP mode, a DIRECT mode, a mode in which no previous macroblocks are re-encoded, and a mode in which no subsequent macroblocks are re-encoded.

2. The method according to claim 1, wherein step (c) comprises:
   replacing a coded representation for each of said macroblocks having said null information pattern with that corresponding to encoding with said non-residual mode enabled.

3. The method according to claim 1, wherein said non-residual mode comprises a PSKIP mode in which said marcroblock having said null information pattern is based on a second presentation of a previous macroblock.

4. The method according to claim 1, wherein said non-residual mode comprises a DIRECT mode.

5. The method according to claim 1, wherein said null information pattern comprises a quantized macroblock having all zero DCT coefficients and zero motion vector difference information.

6. The method according to claim 1, wherein said encoding comprises rate distortion optimized motion estimation and quantization.

7. The method according to claim 6, further comprising the steps of:
   (A-1) re-encoding said macroblocks with an increased quantization parameter;
   (B-1) re-checking each of said macroblocks for said null information pattern;
   (C-1) re-encoding each of said macroblocks having said null information pattern with said non-residual mode enabled; and
   (D-1) in place of step (C-1), replacing coded representation of each said macroblocks having said null information pattern when said macroblock is coded with said non-residual mode.

8. The method according to claim 1, wherein step (B) comprises exact bit pattern matching.

9. The method according to claim 1, wherein step (B) comprises rate-distortion comparison of coded representation.

10. The method according to claim 1, wherein said checking of null information pattern includes both exact bit pattern matching and rate-distortion comparison of coded representations.

11. A method for encoding video, comprising the steps of:
    (A) receiving an encoded bitstream comprising a number of macroblocks, wherein said encoded bitstream was generated with a non-residual mode disabled;
    (B) checking each of said macroblocks for a null information patter; and
    (C) transmitting a subset of macroblocks in said macroblocks with said non-residual mode enabled, the subset of macroblocks having said null information pattern; and
    wherein said non-residual mode is selected from a group consisting of a PSKIP mode, a DIRECT mode, a mode in which no previous macroblocks are re-encoded, and a mode in which no subsequent macroblocks are re-encoded.

12. An apparatus comprising:
    an encoder circuit configured to encode a number of macroblocks of a video signal; with a non-residual mode disabled;
    a detection circuit configured to check each of said macroblocks for a null information pattern;
    a control circuit configured to initiate transmitting a subset of macroblocks in each of said macroblocks with said non-residual mode enabled, the subset of macroblocks having said null information pattern; and
    wherein said non-residual mode is selected from a group consisting of a PSKIP mode, a DIRECT mode, a mode in which no previous macroblocks are re-encoded, and a mode in which no subsequent macroblocks are re-encoded.

13. The apparatus according to claim 12, wherein said re-encoding is performed in said encoder.

14. The apparatus according to claim 12, wherein said re-encoding is performed in a second encoder circuit.

15. The apparatus according to claim 14, wherein said encoder circuit is implemented on the first integrated circuit and said second encoder circuit is implemented on a second integrated circuit.

16. The apparatus according to claim 12, wherein said non-residual mode comprises a PSKIP mode in which said marcroblock having said null information pattern is based on a second presentation of a previous macroblock.

17. The apparatus according to claim 12, wherein said non-residual mode comprises a DIRECT mode.

* * * * *